United States Patent [19]

Smith et al.

[11] Patent Number: 5,696,864
[45] Date of Patent: Dec. 9, 1997

[54] AERIAL ENCLOSURE FOR COUPLING DATA SIGNALS TO A CUSTOMER SITE

[75] Inventors: William D. Smith, Marietta; George Hicks, Snellville, both of Ga.

[73] Assignee: Communications Technology Corporation, Ala.

[21] Appl. No.: 718,156

[22] Filed: Sep. 18, 1996

[51] Int. Cl.$^6$ .................................................. G02B 6/46
[52] U.S. Cl. ................................. 385/135; 385/134
[58] Field of Search ................................ 385/134, 135

[56] References Cited

U.S. PATENT DOCUMENTS

| | | | |
|---|---|---|---|
| 3,836,696 | 9/1974 | Gressitt et al. | 174/41 |
| 3,852,114 | 12/1974 | Bush et al. | 179/98 |
| 3,919,495 | 11/1975 | Berglund et al. | 179/98 |
| 4,032,212 | 6/1977 | Faust et al. | 339/109 |
| 4,479,196 | 10/1984 | Ferrer et al. | 364/900 |
| 4,489,830 | 12/1984 | Charlebois et al. | 206/316 |
| 4,503,283 | 3/1985 | Hancock et al. | 174/22 |
| 4,646,229 | 2/1987 | Boyle | 364/200 |
| 4,698,752 | 10/1987 | Goldstein et al. | 364/200 |
| 4,704,499 | 11/1987 | Faust | 174/92 |
| 4,708,430 | 11/1987 | Donaldson et al. | 385/135 |
| 4,721,830 | 1/1988 | Dagan et al. | 174/41 |
| 4,761,053 | 8/1988 | Cogelia et al. | 385/111 |
| 4,818,824 | 4/1989 | Dixit et al. | 174/92 |
| 4,861,134 | 8/1989 | Alameel et al. | 385/78 |
| 4,898,448 | 2/1990 | Cooper | 385/135 |
| 4,932,744 | 6/1990 | Messelhi | 385/78 |
| 5,017,155 | 5/1991 | Doyle | 439/532 |
| 5,046,811 | 9/1991 | Jung et al. | 385/15 |
| 5,090,792 | 2/1992 | Koht et al. | 385/32 |
| 5,093,886 | 3/1992 | Smoker et al. | 385/135 |
| 5,117,476 | 5/1992 | Yingst et al. | 385/88 |
| 5,133,039 | 7/1992 | Dixit | 385/135 |
| 5,136,121 | 8/1992 | Kluska et al. | 174/93 |
| 5,155,304 | 10/1992 | Gossett et al. | 174/117 |
| 5,155,794 | 10/1992 | Nolf et al. | 385/135 |
| 5,222,183 | 6/1993 | Daems et al. | 385/135 |
| 5,285,515 | 2/1994 | Milanowski et al. | 385/135 |
| 5,313,546 | 5/1994 | Toffetti | 385/135 |
| 5,322,973 | 6/1994 | Dagan | 174/92 |
| 5,323,480 | 6/1994 | Mullaney et al. | 385/135 |
| 5,387,763 | 2/1995 | Messelhi | 174/92 |
| 5,408,571 | 4/1995 | Kaplan | 385/135 |
| 5,440,665 | 8/1995 | Ray et al. | 385/135 |
| 5,440,666 | 8/1995 | Burek et al. | 385/135 |
| 5,446,823 | 8/1995 | Bingham et al. | 385/135 |
| 5,459,808 | 10/1995 | Keith | 385/135 |
| 5,479,553 | 12/1995 | Daems et al. | 385/135 |
| 5,509,099 | 4/1996 | Hermsen et al. | 385/134 |

OTHER PUBLICATIONS

"Cab–Term Fiber Optic Cabinet Family," Communications Technology Corporation, 44–00114/rev. 1.00, 1995.
"Hawk–Lite Aerial Fiber Optic Splice Closure," Communications Technology Corporation, 44–00113REV.100, 1995.

*Primary Examiner*—John D. Lee
*Assistant Examiner*—Ellen E. Kang
*Attorney, Agent, or Firm*—Watts, Hoffmann, Fisher & Heinke Co., L.P.A.

[57] ABSTRACT

An aerial enclosure for use in distributing above ground fiber optic communications signals from a signal source such as a central office to a customer site. The enclosure has first and second enclosure segments that can be separated to expose an enclosure interior where a termination panel is mounted that includes a row of terminal contact pairs to which copper cables are connected for routing conventional telecommunications signals away from the enclosure interior to a customer site. The enclosure includes a communications subsystem mounted within the enclosure having a first fiber optic portion for routing outgoing light signals to an optical network unit outside the enclosure for conversion to electrical signals. A copper portion of the communications subsystem incoming telecommunications signals back into the enclosure where they are redistributed from one or more of the plurality of terminal contact pairs by copper cables to one or more customer sites. A splice connection between a fiber optic strand from an overhead cable is spliced to the first fiber optic portion of the communications subsystem and then positioned within a splice enclosure for environmentally sealing the splice within the aerial enclosure.

12 Claims, 8 Drawing Sheets

AERIAL ENCLOSURE FOR COUPLING DATA SIGNALS TO A CUSTOMER SITE

FIELD OF THE INVENTION

The present invention concerns an aerial enclosure for enclosing splice connections used to tap into a communications line such as a telephone communications line.

BACKGROUND ART

Telephone communications is presently accomplished in most parts of the United States by routing overhead copper cable from a central office to a customer site. The overhead cable that is routed away from the central office is made up of many strands that are bundled together and supported by a support strand that is strung from one telephone pole to the next along a street or highway. In certain areas of the country fiber optic cable is being used to deliver telephone communications signals. The fiber optic cable tends to be used in more populous areas since a higher concentration of signals can be routed through the fiber optic cable than through the copper cable.

Splicing of telecommunications cables is commonly performed both during installation of the cable and when tapping into the cable to service a customer site. As the cable is initially installed, a splice is required at each end of the cable to a next subsequent and immediately previous cable. This type of splice is performed at both ends of the cable as the cable is installed. Cable splicing is also required to form a branch or drop connection from the main cable to a particular subdivision, facility or customer. If the cable that is being tapped into is copper, one strand is cut into and the drop or branch cable is spliced to the cut strand and routed to the customer site.

U.S. Pat. Nos. 5,322,973 and 4,721,830 concern aerial enclosures for protecting an electrical or optical cable splice connections. The disclosure of these two patents is incorporated herein by reference. The aerial enclosures disclosed in the '973 and the '830 patents house a splice connection and also provide termination posts to which multiple sets of drop cables are connected for routing signals to different locations in the vicinity of the enclosure.

When copper cable is used for signal transmission both from the central office to the aerial enclosure and from the enclosure to the customer site, a simple splice connection is made within the aerial enclosure. When the drop connection requires a conversion from the light communications signals that are transmitted through the fiber to electrical signals for transmission through copper, however, a simple splice is not possible.

Optical network units (ONU's) are known that include circuitry to convert the light signals transmitted from the central office to suitable electric signals that can be coupled to the customer site. The ONU receives an optical signal on an ONU fiber optic cable and converts the signal to an electric signal for transmission along a conductor output from the ONU. Use of the ONU requires that a first splice be performed to access the signals from the optical strand from the central office and a second splice to couple electric signals from the ONU to conductors that can then be routed to the customer site.

DISCLOSURE OF THE INVENTION

The present invention concerns an aerial enclosure for distributing above ground communications signals from a signal source such as a central office to a customer site. The aerial enclosure includes a housing having first and second housing segments that can be separated to expose a housing interior. A separation panel is mounted within the housing interior and supports a number of terminal contact pairs to which communications cables are connected for routing signals away from the enclosure interior to one or more customer sites. A support strand positions the housing relative to a communications delivery system that delivers communications signals from the signal source. The structure and method of the invention allow signals from the delivery system to be taken from the communications delivery system and delivered to individual customers.

A communications subsystem mounted within the aerial enclosure has a first communications signal transmission portion for routing outgoing communications signals of a first type transmitted from the signal source away from the enclosure to a location outside the enclosure. At the location outside the housing the signal is converted into a second type communications signal suitable for delivery to a customer site. The communications subsystem includes a second communications signal transmission portion for routing incoming communications signals of the second type back to the separation panel for distribution to a customer site. Signals coupled to the terminal contact pairs route the second type of signal through communications cables leading away from the enclosure to customer sites.

Within the housing signals from the communications delivery system that are of the first type are coupled to the first transmission portion of the communications subsystem for conversion to signals of the second type outside the enclosure. In accordance with one embodiment of the present invention, the communications delivery system includes a bundle of fiber optic overhead cables and the enclosure is mounted to a support strand that also supports the bundle of cables. In this embodiment, the light signals passing through the optical fiber are converted to electrical signals by an ONU outside the aerial enclosure. One housing accomplishes both splicing and distribution.

According to another aspect of the present invention the splice connection between a fiber optic cable from the overhead bundle and a fiber optic cable that forms a part of the subsystem is performed and the splice is then placed within a splice housing inside the aerial enclosure housing. This splice housing provides a degree of environmental sealing so that water seeping into the aerial enclosure will not affect the splice connection. Additionally, the splice housing shields the fiber optic splice connection from possible damage due to vibration and contact with installers making connections to the terminal support after initial installation of the enclosure.

These and other objects, advantages, and features of the invention will become better understood from a review of a description of a preferred embodiment of the invention which is described in conjunction with the accompanying drawings.

BEST MODE FOR PRACTICING THE INVENTION

Figure 1:
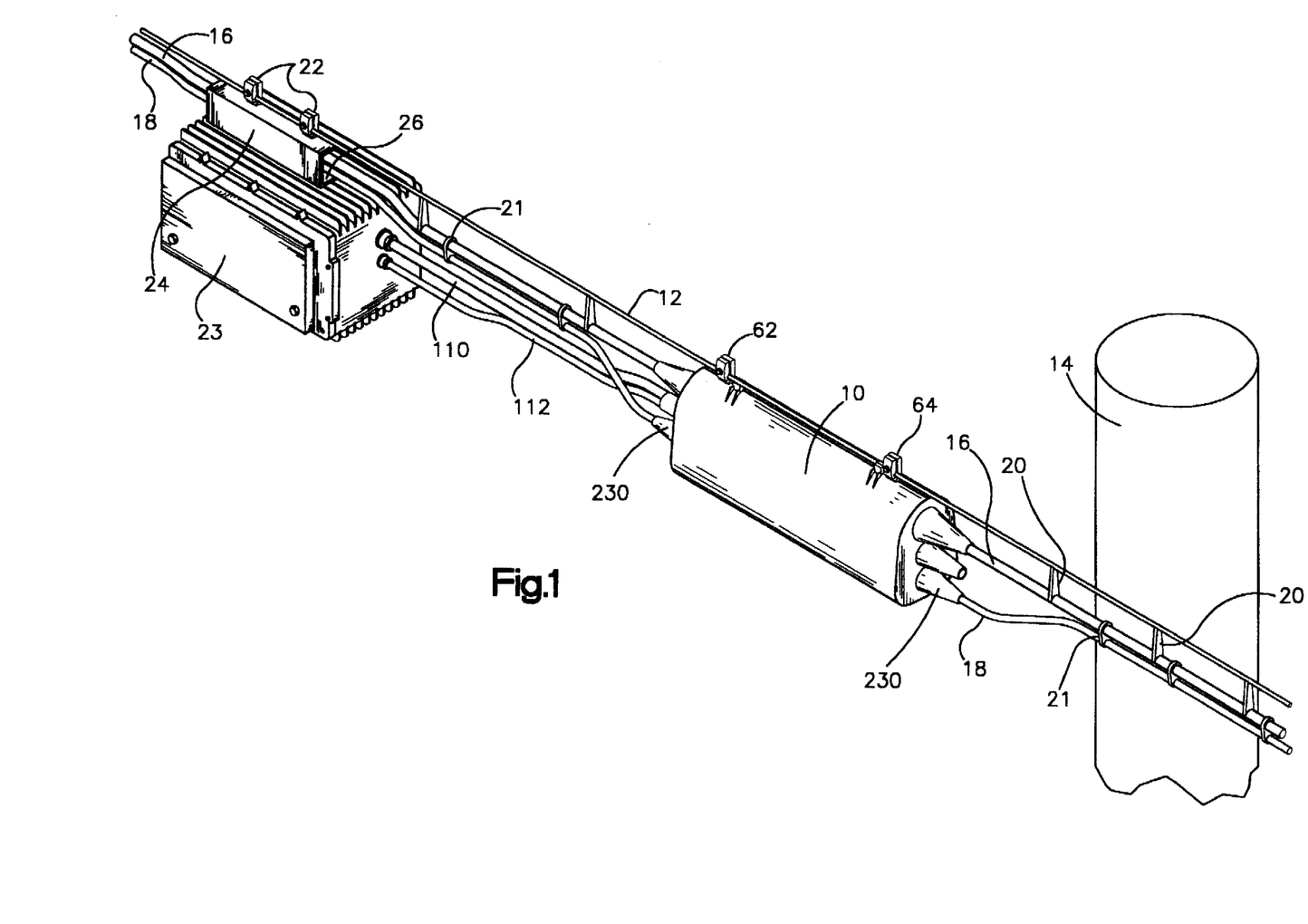
FIG. 1 is a perspective view of an aerial enclosure and telecommunications cable mounted to a support strand that extends between spaced apart telephone poles for routing communications cabling to a customer.

Turning to the drawings, FIG. 1 depicts an aerial enclosure 10 for use in distributing above ground communications signals from a signal source to a customer site. The enclosure 10 is supported by a support strand 12 that is attached to spaced apart telephone poles 14, one of which is shown in FIG. 1. The strand 12 supports a power cable 16 and a communications cable 18 which are attached to the strand 12 by means of spacers 20 extending downward from the strand 12 to the power cable 16. Cable supports 21 connect the power and communications cables 16, 18 together.

The strand 12 also supports an optical network unit 23 (ONU) at a location a short distance from the enclosure 10. The optical network unit 23 includes circuitry for converting optical signals carried by the cable 18 into electrical signals for delivery to a customer site in proximity to the aerial enclosure 10. The optical network unit 23 is installed by the telephone company and typically produced by the telephone company. One example of an end user of such a unit 23 are the Regional Bell Operating Companies (RBOCS). The ONU 23 shown in FIG. 1 is supported by a pair of clamps 22 attached to a spacer 24 that defines a throughpassage 26 for allowing the two cables 16, 18 to pass the ONU 23.

The aerial enclosure 10 includes a housing having first and second molded plastic housing side segments or panels 40a, 40b (FIG. 2) connected together by an elongated hinge 42 that extends along a bottom of the housing. The hinge 42 allows the two side segments or panels 40a, 40b to be pivoted with respect to each other to allow access to an elongated housing interior. The housing interior is closed at its top (opposite the hinge) by a support panel 50.

Figure 2:
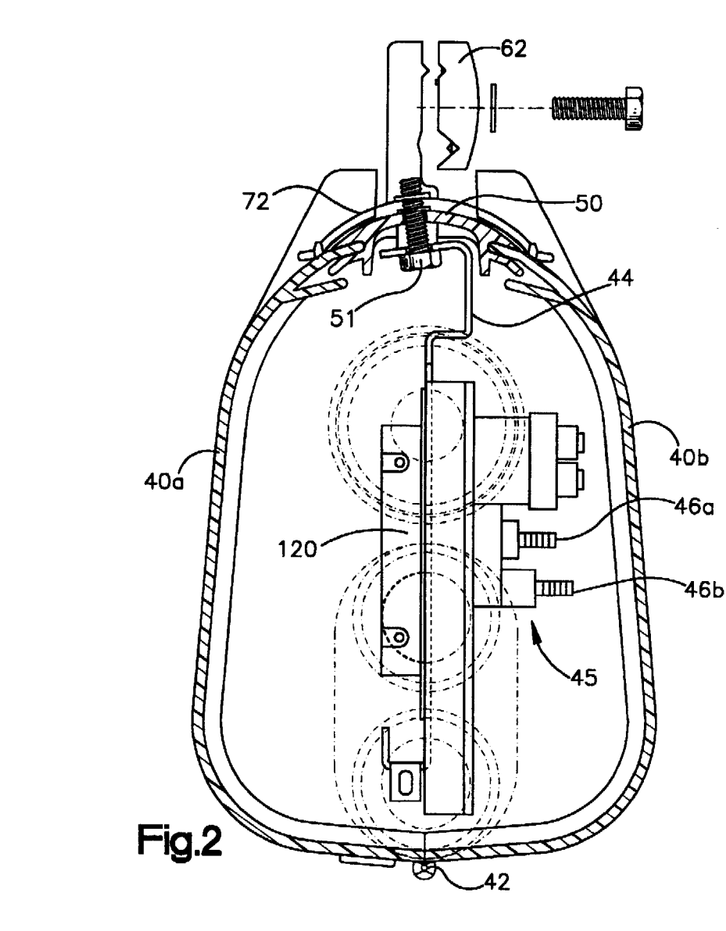
FIG. 2 is a section view of an aerial enclosure constructed in accordance with the present invention.

A metal separation panel 44 is oriented vertically within the housing interior approximately midway between the two panels 40a, 40b and connected to the support panel. The separation panel 44 supports a copper termination assembly 45 that includes an array of twenty five termination posts. This array is divided into two rows 46a, 46b of contact posts so that a pair of contacts is made up of one contact from the top row 46a and an associated contact from the row 46b.

To convey communications signals to one or more customer sites, one or more communications cables 52 are connected to these termination posts. These cables 52 are routed through openings 54 in a bottom section 60 of one housing side panel 40a. By opening the enclosure and making the proper connections to the contact pairs an installer can provide service to a customer site either at the time of installation of the enclosure 10 or subsequent to such installation.

Figure 6:
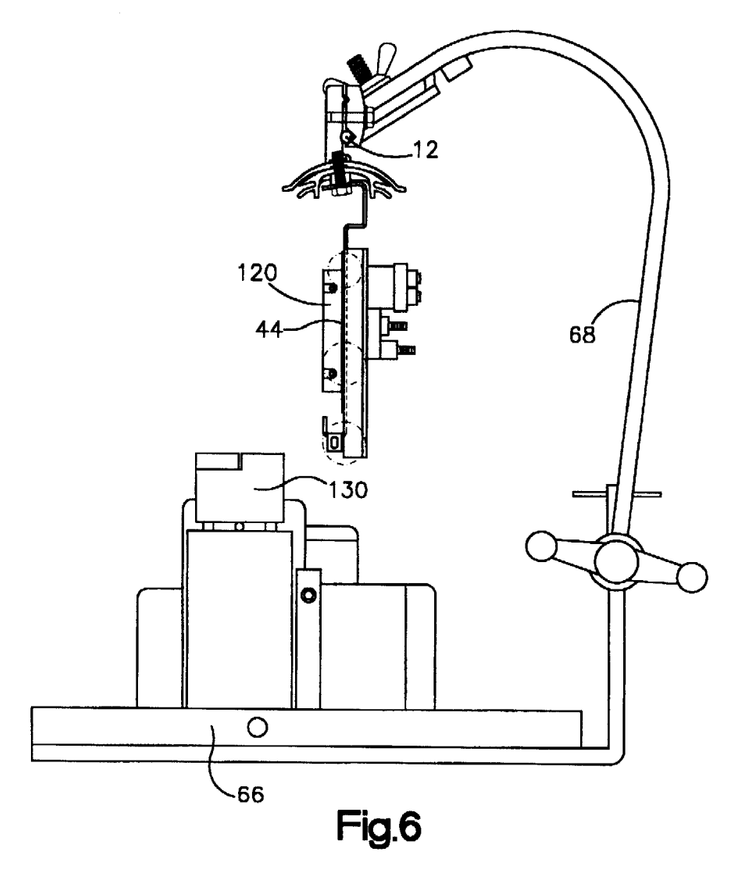
FIG. 6 is a end elevation view of an aerial enclosure installation site including a splice table supported by the same support strand shown in FIG. 1.

As seen in FIG. 1, the enclosure is supported by two hangers 62, 64 that position the housing relative to the pole 14. The enclosure is most preferably mounted within a few feet of the telephone pole 14. FIG. 1 shows the enclosure 10 after splicing connections to the cables 16, 18. Prior to mounting the enclosure, the two cables 16, 18 extend through the passageway of the ONU's spacer 24 and extend through the region occupied by the enclosure in FIG. 1 to the telephone pole 14. Once the enclosure is attached to the support strand 12, the cables are spliced by a person standing on a support many feet above the ground using a special splice table or tray 66 depicted in FIGS. 6 and 7. The table 66 is suspended from the strand 12 by cables 67 at both ends of the tray 66 and by a hanger 68 attached to the middle of the tray 67.

The enclosure 10 has two latches 72, 73 attached to the housing's support panel 50 by connectors 51 that also connect the separation panel 44 to the support panel 50. The latches 72, 73 engage corresponding tabs 74, 75 on the side panels 40a, 40b. One or the other or both of the side segments can be detached from the top segment 50 and pivoted downward out of the way during installation of the enclosure to expose the housing interior. If both panels 40a, 40b are detached from the support panel, a tether (not shown) prevents the panels from falling away from the installer to the ground.

Figure 3:
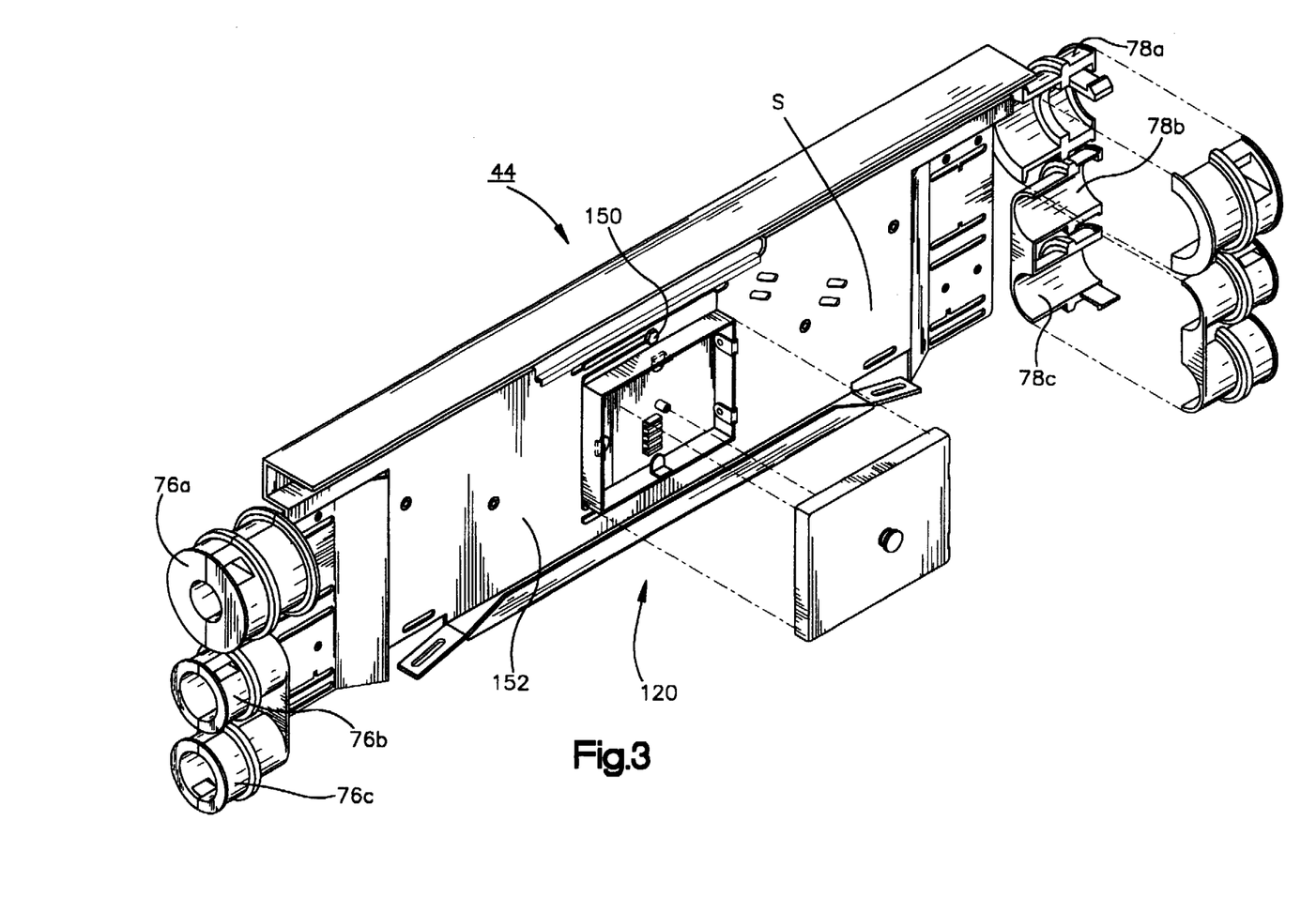
FIG. 3 is a perspective view of a separation panel that is mounted within the aerial enclosure of FIG. 2.
Figure 4:
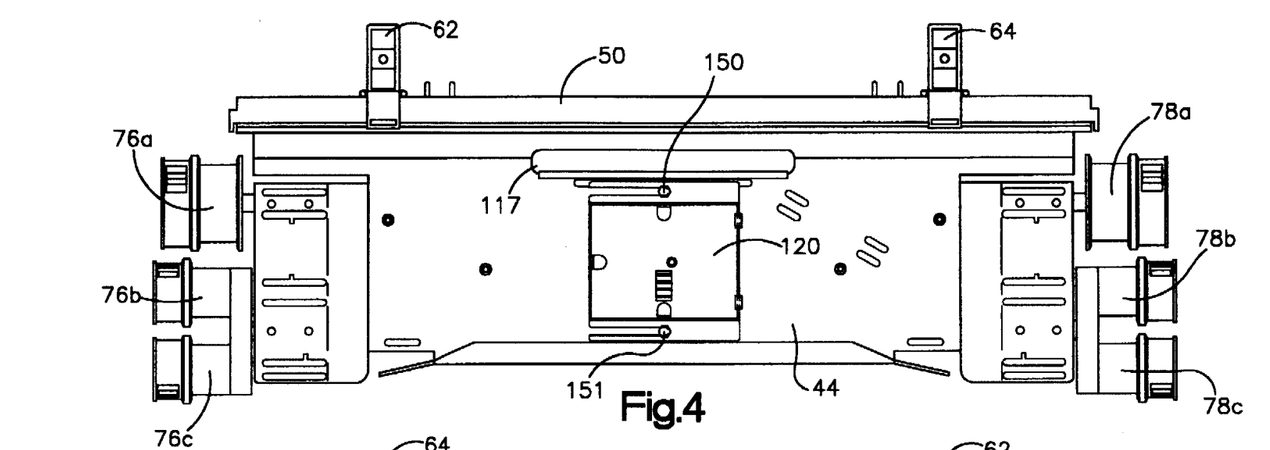
FIG. 4 is a plan view of the separation panel on a side of the separation panel where a fiber optic splice is performed.
Figure 5:
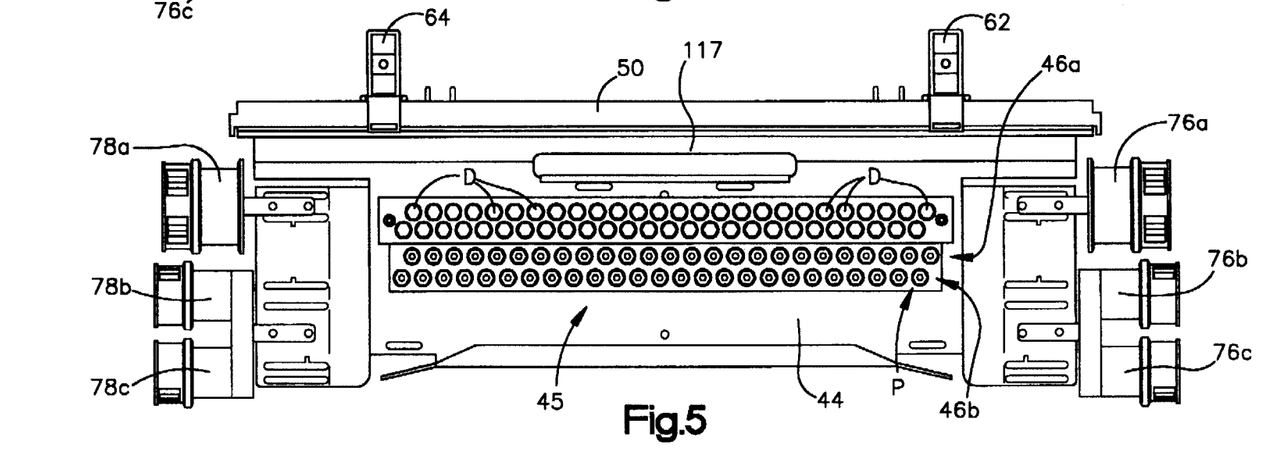
FIG. 5 is a plan view of a side of the separation panel opposite to the side depicted in FIG. 4.

The housing interior is roughly divided into two equally sized spaces by the separation panel 44. Two groupings of three endcaps 76a, 76b, 76c and 78a, 78b, 78c are attached to the separation panel 44. With the side portions 40a, 40b attached to the top portion 50 these endcaps extend through openings 80 in end walls 82, 84 of the enclosure 10 defined by the side panels 40a, 40b. As depicted in the perspective view of FIG. 3 each of these end caps are split along their length so they can be separated into two generally equal halves. One half remains connected to the separation panel 44 and a second half is removed to allow cabling to be routed through the endcap. With one half of the end cap removed, the cables 16, 18 fit into a semicircular channel or slot 86 of the endcap portion that remains attached to the separation panel 44. After fitting the cable within this channel, the segmented part of the end cap that was removed is replaced. In this way, the cables 16, 18 can be routed next to the separation panel 44 on a splice side S of the panel. Splicing is most preferably accomplished with both the side panels pivoted out of the way, but may also be accomplished with only the panel 40a covering the splice side S pivoted down away from the support panel 50.

Within the enclosure, a communications subsystem for tapping into the cable 18 includes a first transmission cable 110 for routing outgoing communications signals of a first type transmitted from the central office from a splice connection C within the enclosure 10 outside the enclosure to the ONU 23. Circuitry within the ONU converts the first type signal to an electrical signal of a second type and routes this second type signal back into the enclosure through a second transmission cable 112.

Figure 7:
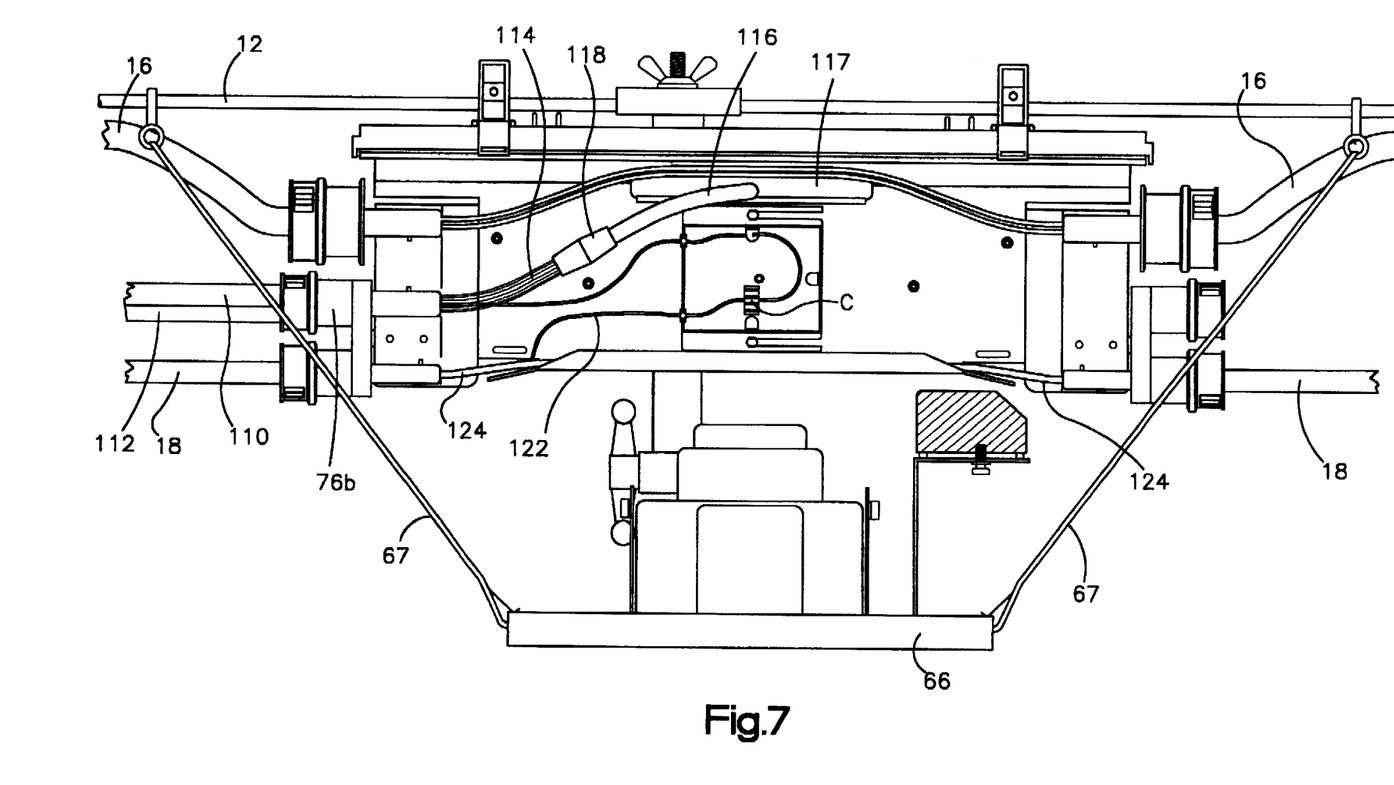
FIG. 7 is a front elevation view showing the splice table and wiring connections inside the aerial enclosure.
Figure 8:
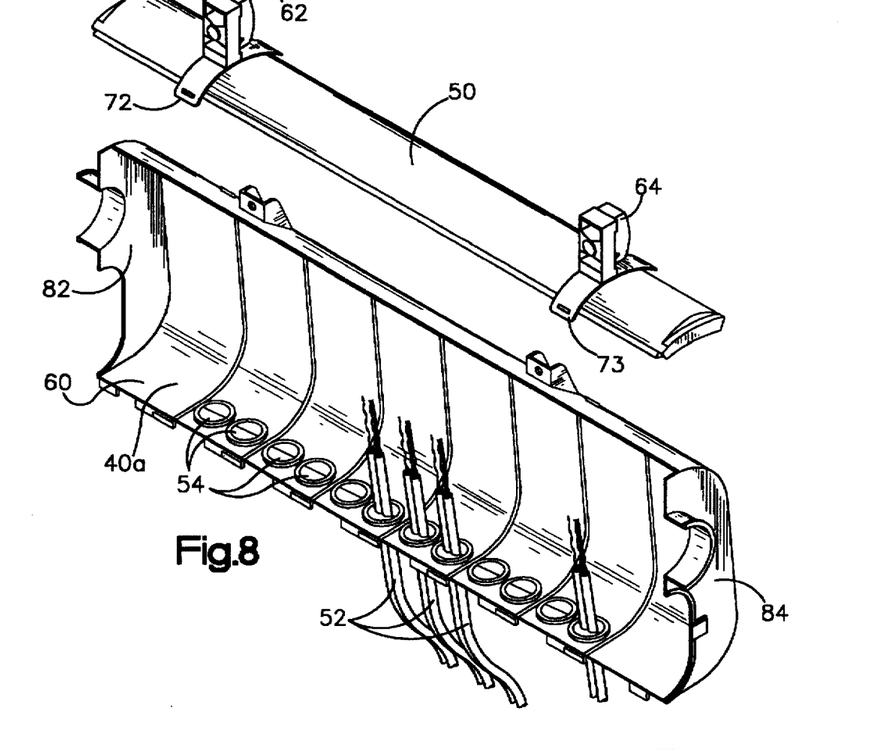
FIG. 8 is a perspective view of a top segment of the aerial enclosure and one side segment of the enclosure.
Figure 9:
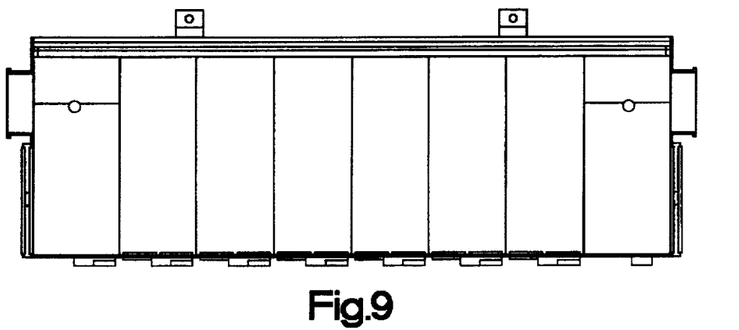
FIG. 9 is a elevation view of the one side segment depicted in FIG. 8.
Figure 10:
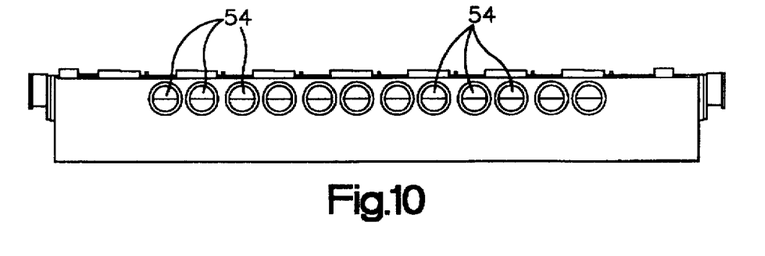
FIG. 10 is a bottom plan view of the one side segment depicted in FIG. 8.
Figure 11:
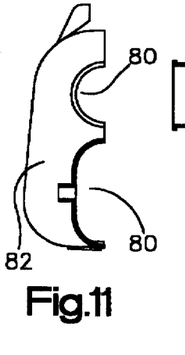
FIG. 11 is an end elevation view of the one side segment depicted in FIG. 8.

As seen most clearly in FIG. 7 the second transmission cable 112 enters the enclosure through the endcap 76b by which the cable 110 exits the enclosure. Inside the enclosure 10 an outer insulator of the cable is removed to expose a plurality of individual insulated wires 114 which are coupled to a wiring harness 116 by an electrical connector 118. The wires that make up the wiring harness 116 pass through an opening 117 in the separation panel 44 to the other side of the panel having the termination assembly 45 of contact posts. The wiring harness is assembled in advance and the wires are connected to the contacts through surge suppression devices D mounted to the contact assembly above the two rows of contacts 46a, 46b. Incoming signals from the central office are thus converted and made available within the enclosure for routing to the customer sites by means of the cables 52. Within the enclosure 10 an outer insulator is removed from the power cable 16 and power is spliced from the individual insulated conductors of the cable 16. A splice power cable is connected to an endmost pair P of the termination assembly 45.

A splice housing 120 is mounted to the separation panel 44 inside the enclosure 10. The splice housing 120 provides a secure environment for the splice connection C to maintain reliable transmission of optical signals received from the central office to the cable 110 which routes signals to the ONU 23 for conversion to electrical signals. To access the optical signals of the first type sent from the central office, an installer must first extract one or more strands 122 of the multiple strands 124 contained within the cable 18. An outer jacket of insulating material is removed from the cable 18 to expose the strands 124 with the cable and one or more strands 122 are pulled from the cable 18 and cut to form a splice end. Cable downstream from the enclosure 10 that is originally connected to the strand or strands 122 is now isolated from the central office and no signal is present within these strands. The strands 124 of the cable passing through the enclosure are supported by a channel forming base 128 of the separation panel 44.

Using the splice tray 67 and a cable splicer 130 supported by the tray 67, the installer forms a splice connection C between the cut end of the strand or strands 122 and the strands 126 that extend out of the end of the cable 110. A suitable splice tray and cable splicer can be purchased from Communications Technology Corp. Of Atlanta, Ga., assignee of the present invention.

Figures 12, 12A, 13:
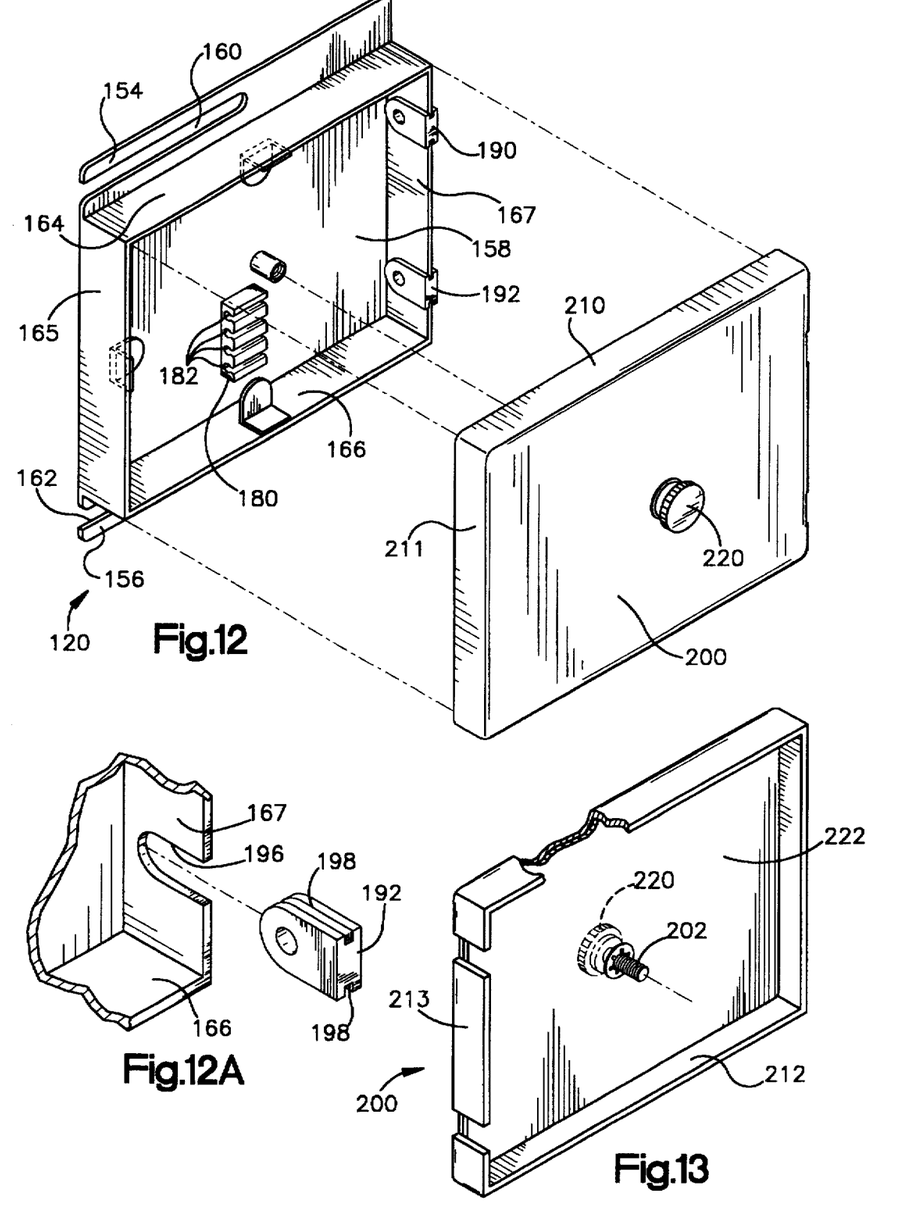
FIG. 12 is a perspective view of a splice housing that is supported inside the aerial enclosure.
FIG. 12A is an enlarged perspective view of a portion of a sidewall of the splice housing.
FIG. 13 is a perspective view of a splice housing cover.

The splice housing is secured to the separation panel 44 by means of connectors 150, 151 that extend through a generally planar surface 152 of the separation panel 44. Two channel defining fingers 154, 156 are integral with a back wall 158 of the splice housing 120 that rests against the planar surface 152. These fingers define two channels 160, 162 which allow the housing 120 to be oriented in either of two orientations and slid along the panel 44 to a desired position. The splice housing 120 is then fixed by tightening the two connectors 150, 151.

The housing has four side walls 164–167 that define a rectangular interior bounded by the back wall 158. Extending inwardly from three of the four walls are cable guides 170 that retain coiled fiber optic cable within the housing 120. Extending outwardly away from the back wall 158 is a cable restraint 180 constructed from plastic that defines four parallel channels 182 into which fiber optic cable can be inserted. The splice connection C of spliced together ends of the fiber optic cables is inserted within the channels 182 to hold the splice connection relatively immobile.

The fiber optic cable is routed into the housing 120 through two rubber grommets 190, 192 that fit within openings 196 in one endwall 167 of the housing 120. To splice the ends of two strands together an end of each strand is pushed through an opening 190a, 192a of one of the grommets and the splice connection made. The connection C is then placed within one of the channels 182 inside the housing 120 and the grommet inserted into the one of the openings 196. Grooves 198 extend around three sides of the grommet that engage edges of the openings in the housing wall.

A housing cover 200 encloses the connection C within the housing 120. The cover 200 defines an opening through which a threaded portion of a post 202 is pushed. A knurled knob 220 is attached to the post and remains on an opposite side of the cover. The threaded portion of the post 202 engages a threaded opening of a stud 204 extending away from the back wall 158. The cover is sized such that flanged side walls 210–213 of the cover overlie the walls 164–167 and the stud 204 enters the post 202. The cover 200 is secured in place by rotating the knurled knob 220 connected to the threaded post 202.

A generally planar pad 222 fits within the cover and butts against edges of the walls 164–167. An opening in the pad 222 allows the pad to be pushed over the stud 204 that extends away from the back wall 158. The pad is held in place by a suitable adhesive and is preferably constructed from an elastomer material. When the pad is compressed against edges of the walls 164–167 as the knob 220 is tightened, the connection is sealed within the confines of the housing 120 which inhibits seepage of water and other foreign materials into contact with the connection C. The two grommets are constructed of a similar elastomer material and grip against the fibers that pass through the grommet as well as form a seal between the grommet and the edge of the openings that contain the grommet. Subsequent to insertion of the connection C into the splice enclosure 120 and placement of the cover 200 over the connection the two panels 40a, 40b are secured to the support panel 50 to enclose the two rows of terminal posts within the enclosure. With the panels closed 40a, 40b the cables shown in FIG. 7 extend out both sides of the enclosure 10 through the endcaps 76a–76c, 78a–78c. Cone shaped covers 230 are placed over the region where the cables exit the enclosure. These covers seal a region of the cable where the cable enters the closure and impede entry of moisture into the enclosure along the cable.

Figure 14A:
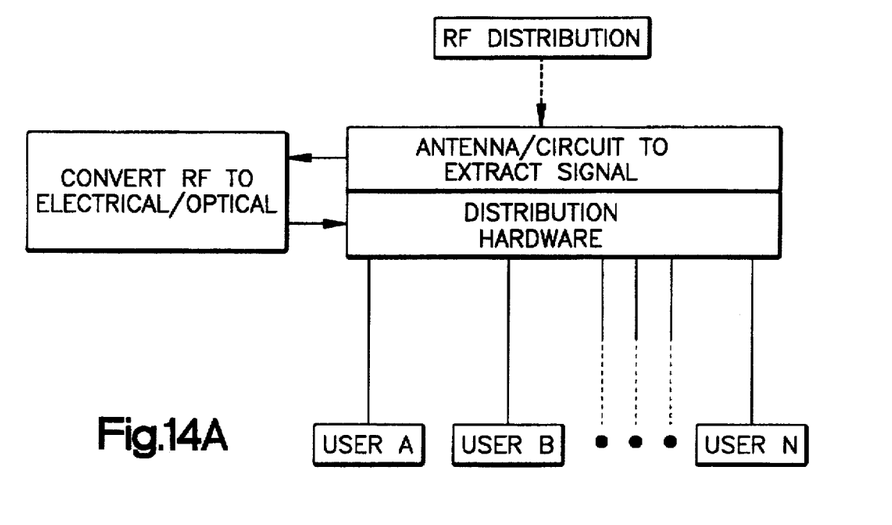
FIGS. 14A and 14B illustrate in a schematic manner other communications arrangements for use with the present invention.
Figure 14B:
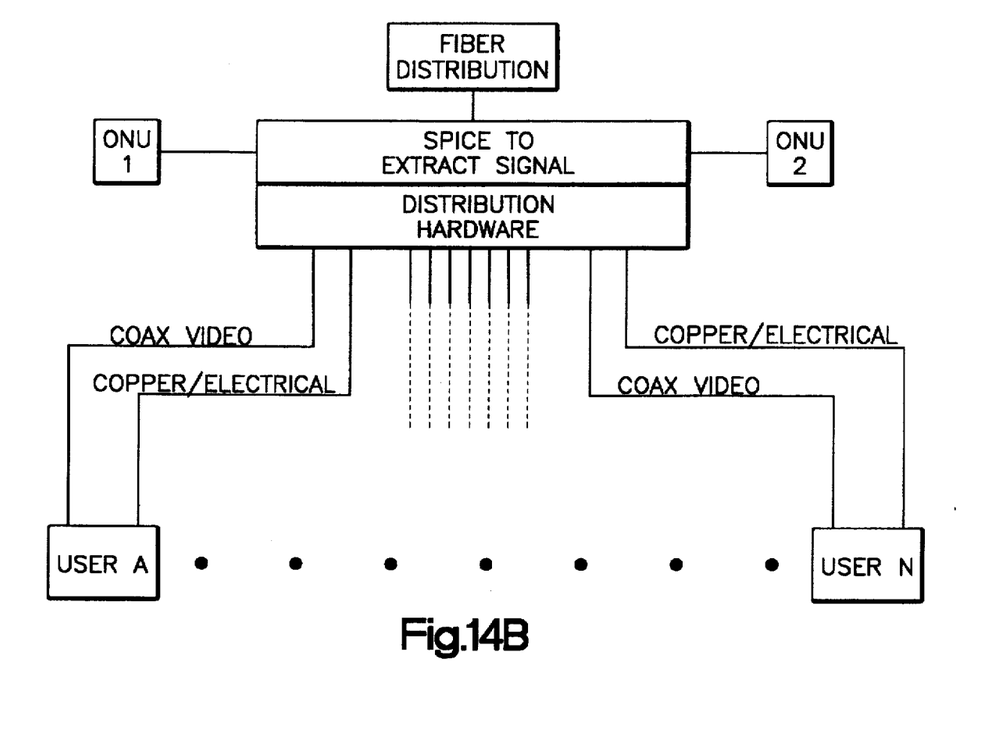

The preferred enclosure 10 has been described for distribution of signals from a central office to a customer that require conversion of fiber optic light signals into electric signals for retransmission through copper cable. As seen in FIGS. 14A and 14B, however, the disclosed enclosure could be used in other delivery systems for converting signals of one type to another. In FIG. 14A a rf communications signal is extracted by an antenna supported on the aerial enclosure housing and routed from the housing to a radio transceiver that converts the RF signals to standard electric telecommunications signals for transmission to a customer site. In FIG. 14B a fiber optic signal is converted to either a video signal or a standard electrical signal and then retransmitted to a customer site.

While multiple embodiments of the present invention have been described with a degree of particularity, it is the intent that the invention include all modifications and alterations from the disclosed embodiments falling within the spirit or scope of the appended claims.

We claim:

1. An aerial enclosure for use in distributing above ground communications signals from a signal source to a customer site comprising:
   a) a housing having first and second housing segments that can be opened to expose a housing interior;
   b) a separation panel mounted to the housing within a housing interior and including a plurality of terminal contact pairs to which communications cables are connected for routing signals away from the housing interior to a customer site;
   c) a support for positioning the housing for receipt of communications signals originating at the signal source;
   d) a communications subsystem having a first transmission segment for routing communications signals of a first type originating from the signal source away from the enclosure to a location outside the housing for conversion to a second type of signal, said subsystem having a second transmission segment for routing communications signals of the second type back into the housing to the separation panel for distribution to a customer site through one or more of the plurality of terminal contact pairs by means of the communications cables leading to one or more customer sites; and
   e) structure for coupling signals from the signal source of the first type to the first transmission segment of the communications subsystem for conversion to signals of the second type.

2. The apparatus of claim 1 wherein the signal source is coupled to a plurality of fiber optic strands and wherein the structure for coupling signals comprises means for splicing or joining one or more fiber optic strands to a second set of one or more fiber optic strands that forms a part of the first transmission segment of the communications subsystem.

3. The apparatus of claim 2 wherein the means for splicing comprises a splice housing mounted to the separation panel that encloses a splice connection between the one or more fiber optic strands and the second set of one or more fiber optic strands.

4. The apparatus of claim 3 wherein the splice housing has a removable lid and sidewalls that define at least two gaps to allow the one or more fiber optic strands to be routed into the splice housing and to allow the one or more fiber optic strands of the second set of fiber optic strands to be routed away from the splice housing.

5. The apparatus of claim 4 wherein an inner portion of each of the at least two gaps is bounded by elastomeric grommet.

6. The apparatus of claim 5 wherein each elastomeric grommet has a hole through which one or more fiber optic strands are inserted prior to splicing together the fiber optic strands.

7. The apparatus of claim 1 wherein the communications subsystem comprises co-axial cable for delivering video signals.

8. The apparatus of claim 1 wherein the communications subsystem comprises means for transmitting radio frequency signals.

9. A method for use in tapping into an above ground communications transmission cable having multiple fiber optic strands comprising the steps of:
   a) providing an enclosure having first and second enclosure portions that open to expose an enclosure interior;
   b) supporting a termination panel within the enclosure interior that includes a plurality of terminal contact pairs to which communications cables are connected for routing communications signals away from the enclosure interior to a customer site;
   c) supporting the enclosure by connecting the enclosure to the above ground communications transmission cable;
   d) tapping a portion of the communications signals transmitted through the communications transmission cable by cutting into one fiber optic strand carried by the cable and routing the one strand into the enclosure;
   e) splicing the one strand to a second fiber optic strand for routing communications signals transmitted by the one strand away from the enclosure;
   f) converting communications signals transmitted by the one strand into a second type of communications signal and routing the second type of communications signal back into the enclosure; and
   g) coupling said second signals to one or more sets of the terminal contact pairs within the enclosure for transmission to one or more subscriber locations outside the enclosure.

10. The method of claim 9 wherein subsequent to the splicing step a splice connection between the one strand and the second fiber optic strand is positioned within a second enclosure for environmentally shielding the splice connection.

11. The method of claim 9 wherein prior to splicing the fiber optic cables each cable is inserted through an elastomeric grommet and after splicing the grommet is inserted into walls of a splice enclosure to seal the splice connection within said splice enclosure.

12. An aerial enclosure for use in distributing above ground fiber optic communications signals transmitted on an overhead fiber optic cable that extend from a central office to a telecommunications customer site comprising:
   a) housing structure including:
      i) first and second housing panels that can be opened to expose a housing interior and including end walls that define access openings for routing communication cables into said housing interior;
      ii) a support panel having closure latches that engage the first and second housing panels to allow the first and second housing panels to be opened and closed to access a housing interior; and
      iii) a hanger coupled to the support panel for positioning the housing for receipt of fiber optic signals originating at the central office;
   b) a separation panel mounted to the housing structure within a housing interior and including a plurality of terminal contact pairs to which communications cables are connected for routing signals away from the housing interior to a customer site;
   c) a communications subsystem including:
      i) a first fiber optic transmission segment for routing fiber optic light signals from the central office that enter the housing interior through the overhead fiber optic cable through the access openings away from the enclosure to a converter located outside the housing for conversion to electrical signals, and ii) a second electrical conductor transmission segment for routing electrical signals from the converter back into the housing to the separation panel for distribution to a customer site through one or more of the plurality of terminal contact pairs; and
   d) splice structure for coupling signals from the central office to the first fiber optic transmission segment of the communications subsystem including a splice housing coupled to the separation panel for enclosing a splice connection and including elastomeric entry defining grommet means for sealing the one or more fiber optic strands extracted from the overhead fiber optic cable at an entry location of the splice housing and for sealing the first fiber optic transmission segment at an exit location from the splice housing.

* * * * *